United States Patent [19]

Merten

[11] Patent Number: 4,466,202
[45] Date of Patent: Aug. 21, 1984

[54] ENERGY-EFFICIENT EVAPORATION PROCESS WITH MEANS FOR VAPOR RECOVERY

[75] Inventor: Ulrich Merten, Pittsburgh, Pa.

[73] Assignee: Bend Research, Inc., Bend, Oreg.

[21] Appl. No.: 473,030

[22] Filed: Mar. 7, 1983

[51] Int. Cl.³ .............................................. F26B 3/06
[52] U.S. Cl. ......................................... 34/27; 34/32; 34/35; 34/73; 34/77
[58] Field of Search ................... 34/27, 32, 35, 73, 77, 34/79; 55/16, 158; 159/46; 203/26

[56] References Cited

U.S. PATENT DOCUMENTS

| | | | |
|---|---|---|---|
| 3,511,031 | 5/1970 | Ketteringham et al. | 55/158 |
| 3,540,986 | 11/1970 | Guarino | 203/26 |
| 3,735,559 | 5/1973 | Salemme | 55/16 |
| 3,980,605 | 9/1976 | Steigelmann et al. | 55/16 |
| 4,134,216 | 1/1979 | Stevens | 34/77 |
| 4,177,137 | 12/1979 | Kruse | 203/26 |

Primary Examiner—Larry I. Schwartz
Assistant Examiner—David W. Westphal
Attorney, Agent, or Firm—Chernoff, Vilhauer, McClung, Birdwell & Stenzel

[57] ABSTRACT

A process is disclosed for the recovery and reuse of heat contained in the wet exhaust gases emanating from a solids dryer or liquor concentrator, particularly one in which drying or concentration is facilitated by purging the vapor with some noncondensable gas such as air or nitrogen. Water or solvent vapor in the moist exhaust mixture is separated from the noncondensable gas or gases by preferentially passing the vapor through a semipermeable membrane. The water or solvent vapor is then compressed and subsequently condensed in a heat exchanger, permitting recovery of its latent heat of vaporization for reuse in the evaporation process. In a drying process, this recovered energy is conveniently used to reheat the dry gases that exit from the membrane separator, permitting the hot, dry gases to be recirculated through the dryer. Alternatively, an indirect heat exchanger may be used to transfer this heat to the material being dried. In an evaporative process for the concentration of a liquor, the recovered energy may be used either to preheat the dry purge gases or to heat the dilute liquor being concentrated.

37 Claims, 2 Drawing Figures

ENERGY-EFFICIENT EVAPORATION PROCESS WITH MEANS FOR VAPOR RECOVERY

BACKGROUND OF THE INVENTION

This invention relates to a method for improving energy and solvent recovery in various industrial evaporation processes wherein a volatile component is vaporized from a wet material and carried away by contact with a hot, relatively dry gas stream. More particularly, the invention is concerned with the drying of moist solids or semi-solid pastes and with the concentration of dilute liquors, both of which are common, energy-consuming processes.

Most industrial evaporation is done by passing heated gases (often air or nitrogen) through or around the material to be dried, and then venting the warm, moist mixture of gases and vapors to the atmosphere. The energy for heating the solid and evaporating the liquid contained therein may be supplied in one of several ways. For example, the gaseous drying medium may be preheated in a heat exchanger (frequently, one in which process steam is condensed) located upstream of the dryer, so that the energy required in the dryer is carried in as the sensible heat of the hot drying gases. Alternatively, the heat exchanger may be located in the dryer itself (particularly convenient in the case of a fluidized bed dryer) so that the heat may be transferred directly to the material being dried. In such processes, the large quantities of heat required to evaporate the water or solvent are lost in the form of the sensible and latent heats of the vented gas/vapor mixture. As a result of this loss of energy, the cost of energy makes up a large percentage of the total cost of drying and concentration operations, and this cost is increasing due to the ever-rising cost of fuel.

Mixtures of vapors and noncondensable gases are also produced in processes which concentrate dilute liquid solutions by evaporation. It is frequently uneconomical to concentrate a solution simply by boiling off the excess solvent, because this requires relatively high-grade heat. Moreover, the higher temperatures often required to boil solvent from a liquid mixture may be unacceptable if a solute is heat-sensitive. In such cases, evaporation and concentration may be effected at a relatively low temperature if a gaseous stream (frequently air or nitrogen) is used to reduce the partial pressure of solvent vapors in the drying atmosphere and to sweep the volatile component from the evaporator. For example, aqueous process waste streams are concentrated in air-blown packed-tower concentrators, the energy required for water evaporation being obtained by the condensation of steam and by the transfer of this energy to the air stream or to the liquor being concentrated. As in the case of a solids drying process, the moist mixture of gases and vapors exiting the concentrator is frequently exhausted to the atmosphere, resulting in losses of materials and of significant amounts of sensible and latent heat, which losses the method of the present invention can substantially reduce.

Another disadvantage of conventional drying or concentration processes is that discharge to the atmosphere of vapors, particularly those of organic solvents, may be unacceptable on economic or environmental grounds. The method of the present invention permits the recovery not only of the solvent vapors themselves but also of the heat contained therein.

The drying of solids and of semi-solid materials such as pastes and the concentration of dilute liquors thus share a number of common features: (1) the basic operation is one of evaporating a liquid; (2) evaporation is frequently assisted by the use of a relatively hot, gaseous drying medium that serves to carry the volatile component out of the dryer or concentrator and, in some cases, to carry the energy required for evaporation into the dryer or concentrator; and (3) a warm mixture of drying gases and vapors is produced that is often exhausted to the atmosphere. Such processes share two major problems: (1) the sensible and latent heat of the gas/vapor mixture is lost upon venting this mixture, resulting in high energy costs; and (2) both the gaseous drying medium and the solvent vapor are simultaneously lost, resulting in high materials costs (except where the drying medium and vapor are air and water vapor, respectively).

One evaporation technique known in the prior art to provide an opportunity for heat recovery is vacuum drying or concentration. Here there is no air to be heated, and the water vapor removed can be compressed to a convenient pressure and condensed in a heat exchanger that returns the heat of condensation to the material being dried or concentrated. The primary disadvantage of such a system is that the material to be dried must be transferred in and out of a vacuum chamber, a difficult task to accomplish at reasonable cost with solid materials. Furthermore, the vacuum dryer itself is a costly piece of equipment since it must often be large and capable of operating at pressures substantially below atmospheric pressure. Because vacuum operation can be problematic, the drying or concentration process is frequently conducted at near-atmospheric pressure, assisted by the supply of a dry gas stream that carries vapors from the dryer and concentrator. Unfortunately, this mode of operation complicates the task of energy and solvent recovery.

A number of methods have been proposed for the recovery of heat from moist or solvent-laden gas and vapor mixtures arising in industrial solids drying and liquor concentration processes. Winstel, in U.S. Pat. No. 4,028,817, describes a heat exchanger-type heat recovery apparatus useful in industrial laundry dryers wherein a transfer of predominantly sensible heat from the hot dryer exhaust gases to fresh, substantially dry air is effected; however, since the vapors in the exhaust mixture are not condensed, their latent heat is not recovered and the vapors are exhausted to the atmosphere. Kulling, in U.S. Pat. No. 4,145,818, discloses a process for the removal and recovery of vaporized liquids from gases in fluidized-bed drying operations that involves cooling a portion of the exhaust gas stream in order to effect the condensation and recovery of vapors present in that stream; however, means for recovering the latent heat contained in the vapors are not provided. Erikson, in U.S. Pat. No. 3,131,035, discloses a three-step process for extracting waste heat from the exhaust gases of a direct-fired dryer or concentrator comprising the steps of exhaust gas scrubbing, a first heat exchange to recover part of the heat contained in the exhaust gases for use elsewhere in the same or another process (e.g., in concentrating a liquor under subatmospheric pressure), and a second high-temperature heat exchange against hot furnace gases for the purpose of preheating the now relatively dry waste gases prior to their incineration in the dryer furnace. Rothchild, in U.S. Pat. No. 4,150,494, teaches the recovery of both the latent heat contained in a vaporized solvent as well as the vapor itself in a process wherein inert nitrogen gas is generated to blanket the material being dried (in this case, a solvent-borne coating on an object). Although the latent heat of the solvent is indeed recovered in this process, it is recovered at a very low effective temperature by using it to vaporize the liquid nitrogen which is the source of the blanketing gas.

Another method of accomplishing heat and solvent recovery is to use a heat pump to refrigerate and dry the exit gases, condensing the vapors in the process and returning the heat removed to the dried, recirculating gases. Stevens, in U.S. Pat. No. 4,134,216, discloses a product drying apparatus for particulate materials based on this principle, and Mehta, in U.S. Pat. No. 4,247,991, describes a process wherein one or more heat pumps in combination with a desiccant bed are used to recover energy and moisture, respectively.

Semipermeable media have also been employed for the recovery of vapors from mixtures with gases. For example, Booth, in U.S. Pat. No. 3,420,069, describes a condensor-separator in which a heat exchanger constructed from porous sintered metal tubes is used to remove condensed and entrained liquids from gas streams, although without significant heat recovery. Ketteringham and Leffler, in U.S. Pat. No. 3,511,031, describe a similar means for dehumidifying air in an enclosed space such as the cabin of a spacecraft by condensing water vapor in pores of microporous membranes, again without heat recovery. Finally, Arnold, in U.S. Pat. No. 3,811,319, describes a membrane gas separator system suitable for the removal of condensable organic materials and, in some cases, of water from gaseous and liquid mixtures for the purpose of permitting analysis of the organic material in the mixture by mass spectrometry or other analytical technique. Only the first of these three patents is concerned with industrial drying, however, and none discloses significant recovery of the latent heat of the vapor for reuse.

Still other techniques have been used to reduce the energy requirements of evaporative processes for the concentration of liquid mixtures or solutions. For example, multieffect evaporation (as discussed on pages 785–790 of King, *Separation Processes*, 2nd edition, 1980) is based on transfer of the latent heat of the vapors generated in one effect to the solution being concentrated in another effect that is operated at a lower pressure and, therefore, at a lower temperature than the first effect. This transfer of energy is accomplished in a heat exchanger that condenses vapors from the first effect and simultaneously heats the liquid in the second effect. Closely related to multieffect evaporation is vapor-compression evaporation, wherein the overhead vapors from the concentrator are compressed and then subsequently condensed in an indirect heat exchanger in contact with the liquid being concentrated. Vapor-compression evapdration is discussed, for example, by Holiday in *Chemical Engineering* 89(1982)118. These processes have been applied, for example, to the concentration of brines and the accompanying production of potable water. While both multieffect evaporation and vapor-compression processes are economical of energy, these processes suffer from the limitation that evaporation must take place at the boiling temperature of the liquid being concentrated, since the use of a gas stream to reduce the temperature of evaporation and to carry away vapors is precluded.

To summarize, known industrial processes for the drying of solids and semi-solids and for the concentration of liquid mixtures and solutions frequently benefit from the use of a relatively hot, gaseous drying medium which serves to carry the volatile component out of the dryer or concentrator and, in some cases, to carry the energy required for evaporation into the dryer or concentrator. The warm mixture of drying gases and vapors which is produced is often exhausted to the atmosphere. The recovery of the energy contained in the gaseous and vapor components in such exhaust mixtures and the recover of the components themselves are longstanding and important problems that remain to be solved.

It is, therefore, an object of the present invention to provide a method for recovering a significant fraction of the sensible and latent heat present in moist or solvent-laden dryer and concentrator exhaust vapors in order to permit the recycle and reuse of that energy in the drying or concentration process and thereby improve the energy efficiency of the evaporation process to an extent and in a manner not previously contemplated.

It is a further object of the present invention to accomplish the efficient recovery of water or solvent vapors present in dryer or concentrator exhaust streams in order to reduce losses of valuable solvents and minimize the environmental impact of their discharge.

Still another object of the present invention is to separate and recover relatively dry gas from the dryer or concentrator exhaust in order to permit its reuse, thus saving the sensible heat contained therein, minimizing the expense of providing fresh gas (particularly important where the gas is more expensive than air), and minimizing environmental pollution. Recycle of the relatively dry gas stream also minimizes the environmental impact of its discharge, since it will generally contain residual amounts of solvent as well as other gaseous and toxic or odiferous components arising in the drying or concentration process.

These and other objects are accomplished by the present invention, which is summarized and described below.

SUMMARY OF THE INVENTION

The present invention lies in a utilization of the fact that a gas-free vapor is much more economically compressed from an energy standpoint than is a mixture of gas and vapor. The invention comprises a method for recovering energy and solvents. According to the present invention, there is provided a process which employs a semipermeable membrane to separate a gas-vapor mixture into two streams containing relatively pure components in order to permit efficient recovery of both the materials and energy contained in these streams.

In one embodiment, the invention comprises a method for recovering and reusing both the sensible heat and the heat of condensation in the exhaust gases from evaporative processes such as solids drying or liquid concentration. According to this embodiment of the present invention, the warm moist gas/vapor mixture exiting the dryer or concentrator is separated into two streams by passing the vapor in the exhaust through a semipermeable membrane that is permeable to vapor, but that retains the warm, gaseous component of the exhaust mixture. The substantially gas-free vapor is then condensed by applying a pressure sufficient to bring the vapor to its dewpoint. Compression of the vapor requires relatively little energy compared to the energy released upon condensation of the vapor. This latent heat of condensation is recovered in a heat exchanger and returned to the evaporation process. A small amount of make-up heat may be added as necessary and the hot dry air thereby rendered suitable for reuse in the dryer or evaporator.

In another embodiment, vaporized solvents that have become mixed with a gas during the course of their use may be recovered for reuse by passing the solvent vapor through a semipermeable membrane, which is permeable to the solvent vapor and impermeable to the gas with which the vapor is mixed, followed by condensation and recovery of the gas-free solvent vapor and recovery of the heat therefrom.

DETAILED DESCRIPTION OF THE INVENTION

Figure 1:
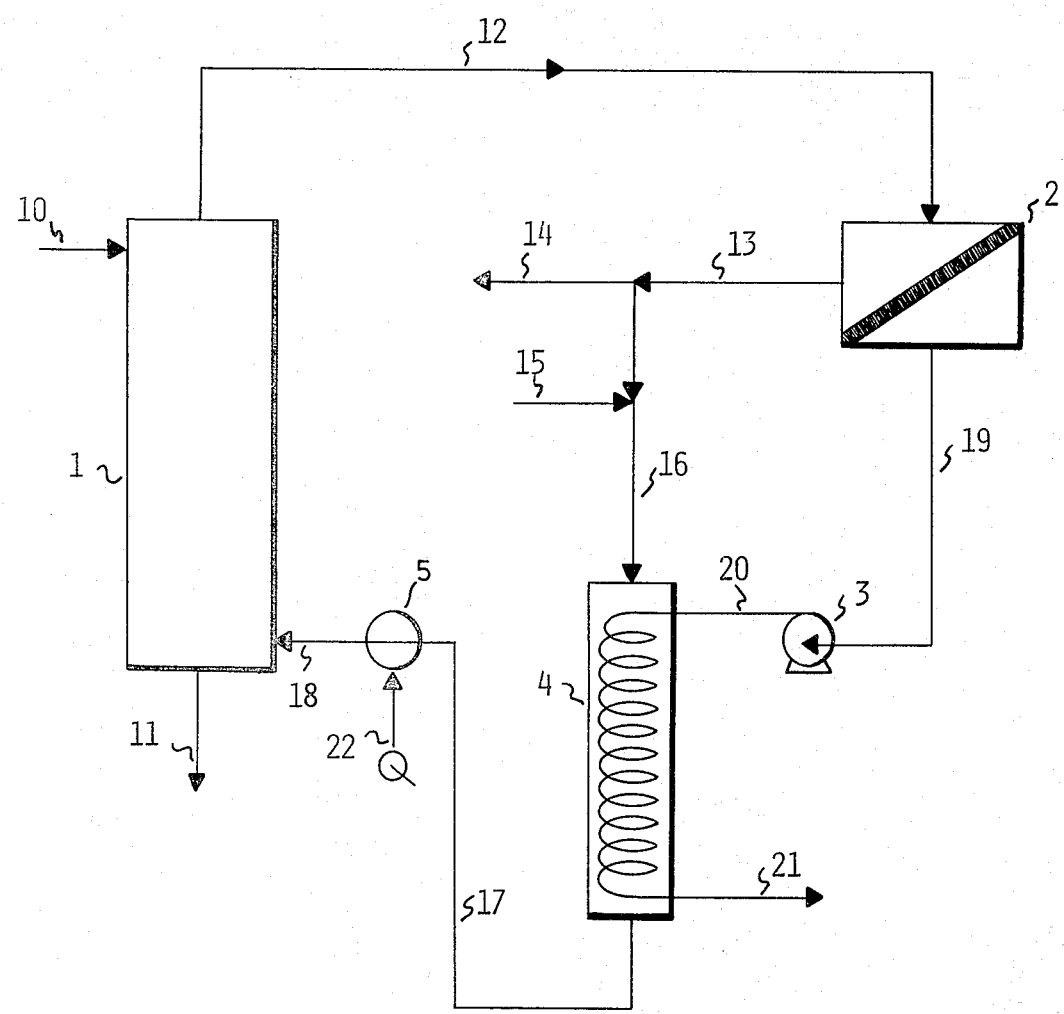
FIG. 1 is a schematic drawing of a system within the scope of the present invention wherein the vapor separated from the moist or solvent-laden dryer or concentrator exhaust mixture is condensed by heat exchange with the separated and relatively dry recycle gases.

An exemplary embodiment of the process of the present invention is shown in FIG. 1. Feed stream 10 refers to a moist or solvent-containing solid or to a dilute liquid mixture or solution, depending upon whether the evaporative process being conducted is one of drying or of concentration. The substantially dry solids or concentrated liquids leave the dryer or concentrator 1 as the product stream 11. The moist exhaust mixture 12 containing both condensable water or solvent vapor as well as substantially noncondensable gas is brought in contact with a semi-permeable membrane 2 that is substantially permeable to water or solvent vapor and substantially impermeable to gases such as nitrogen and oxygen, the primary components of air. The membrane splits the solvent-containing exhaust mixture into two streams: a water or solvent vapor stream 19 and a warm, dry gas stream 13. The water or solvent vapor drawn through the membrane 2 is compressed in a vacuum pump or compressor 3, producing water or solvent vapor 20 at a relatively high pressure, the compression being accomplished with less energy than would be required were the noncondensable gaseous component still present. Compression of the water or solvent vapor serves to increase its saturation temperature, the temperature at which the vapors will condense at the pressure prevailing in stream 20. This increase in the temperature of vapor condensation improves the availability of the recovered latent heat, thereby increasing the opportunities for its reuse in the process.

The heat of condensation of this compressed vapor is recovered in a heat exchanger 4, producing condensed water or solvent 21, which is either recovered, recycled, or exhausted from the system. In the particular embodiment shown in FIG. 1, the heat of condensation is used to reheat the separated, substantially dry gas stream 16 prior to recycling the hot, dry gas to the dryer or concentrator. Make-up heat 22 is added as required to the recycled dry gas stream 17 by means of a heat exchanger 5. The hot, substantially dry gas stream 18 is then sent to the dryer or concentrator, where it effects evaporation. A stream 15 of fresh drying gas will typically be fed to the gas recirculation loop at a small flow rate compared with that of the recirculating gas, and a small purge stream 14 will generally be withdrawn from the recirculation loop at the same low flow rate in order to prevent the accumulation of unwanted gases and other materials which would not readily permeate the membrane.

Figure 2:
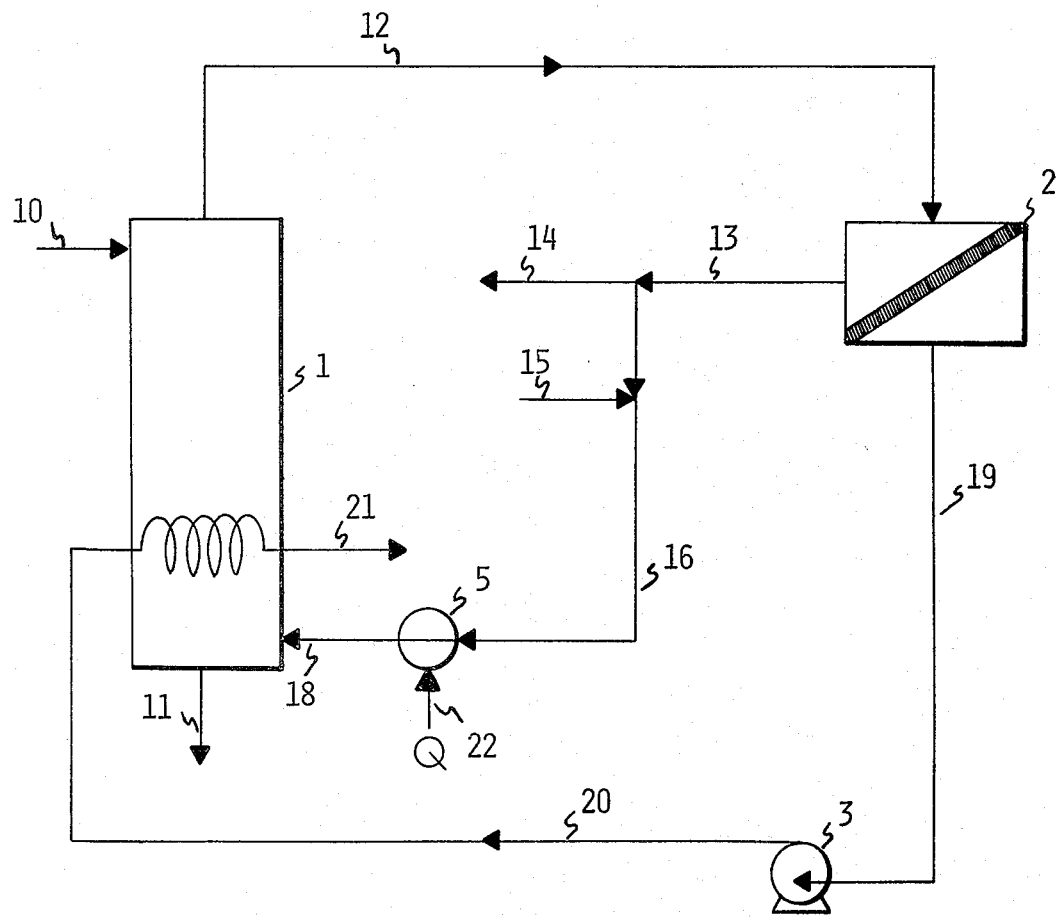
FIG. 2 is a schematic drawing of another exemplary embodiment of the present invention wherein the heat recovered by condensing the separated vapor is transferred directly to the material being dried or concentrated by means of a heat exchanger in contact with said material.

In another embodiment shown in FIG. 2, heat exchange occurs within the dryer or concentrator 1 rather than in separate heat exchange means 4 as in FIG. 1. In the process of FIG. 2, heat is transferred directly from the separated, compressed, and condensing vapor stream 20 present on one side of the heat exchange surface to the material 10 being dried or concentrated, this material being in contact with the other side of the heat exchange surface. For example, in the fluidized-bed drying of a particulate solid, the transfer of heat would occur in heat exchange coils or panels immersed in the fluidized bed of solids. In the concentration of a liquor, heat transfer could be accomplished in heating coils or panels immersed in a pool of the liquid mixture or solution being concentrated. In either case, the particular embodiment described here and shown in FIG. 2 differs from that depicted in FIG. 1 in that recovered vapor and not preheated recycled gas carries the energy required for evaporation into the dryer or concentrator.

In both embodiments, both sensible heat of the gas and the sensible heat and latent heat of condensation of the water or solvent vapor are recovered, which operation markedly reduces the amount of energy required for drying or concentration, notwithstanding the fact that some energy is required to compress the vapor.

Although in theory one could recover the latent heat in the vapor exiting a dryer or concentrator without the use of a membrane by compressing the entire exhaust mixture to the point of condensation of the vapor, this method is impractical because of the large energy requirement for compressing all of the gas along with the vapor. Moreover, the presence of large quantities of noncondensable gases in the mixture would place an unacceptable limit on the fraction of the vapor which could be condensed and thereby recovered at a particular set of operating conditions. The presence of noncondensables has the further undesirable effect of blanketing heat transfer surfaces and reducing rates of heat exchange in the condenser.

Substantial energy savings are possible with a membrane-based drying or concentration system utilizing the present invention. A few illustrative examples will indicate the extent of energy savings possible and will illuminate certain design principles and tradeoffs important to the most beneficial practice of the present invention. First consider a hypothetical air-blown, atmospheric-pressure fluidized bed dryer for the removal of water from particulate solids. It is assumed that the moist exhaust gases leave the dryer at atmospheric pressure and 212° F. containing water vapor at 80% relative humidity, so that the partial pressure of water vapor $P_1$ on the feed side of the semipermeable membrane is then 0.80 atm. It is further assumed that the membrane is perfectly selective for the permeation of water. The water vapor pressure on the product side of the membrane is reduced below $P_1$ by the suction of the compressor 3 to some lower value $P_2$ in order to cause the water vapor to permeate the membrane. The permeated vapor is then compressed to a higher pressure $P_3$ and is subsequently routed to a condenser where its heat content is recovered.

The theoretical or minimum work $W_{ideal}$ required to compress a certain quantity of ideal gas or vapor adiabatically depends primarily on the pressure ratio $P_3/P_2$. Per mole of compressed gas, this ideal, reversible work is given by $$W_{ideal} = \frac{\gamma RT}{\gamma - 1}\left[\left(\frac{P_3}{P_2}\right)^{(\frac{\gamma-1}{\gamma})} - 1\right],$$

where R is the gas constant, T is the absolute temperature, and $\gamma$ is the heat capacity ratio $C_p/C_v$.

The compression ratio $P_3/P_2$ must be kept small in order to minimize energy costs. At the same time, it is desirable to maintain a low pressure $P_2$ downstream of the membrane in order to maximize the flux of water vapor across the membrane and thus reduce the required membrane area. Thus, an optimum permeate pressure $P_2$ exists. If the compressor discharge pressure $P_3$ is set at 1.4 ata in order to effect the condensation of saturated steam at 230° F.—a temperature at which the heat of condensation may be returned to the dryer—then a favorable permeate pressure $P_2$ is about 0.4 ata. Thus $P_3/P_2 = 1.4/0.4 = 3.5$, and the reversible, adiabatic work of permeate compression is thus 5.4 BTU per ft$^3$(STP) of recovered vapor measured at standard conditions of temperature (32° F.) and pressure (1 ata). (Because water vapor is not an ideal gas, the above equation cannot be used to calculate the minimum work of vapor compression with much accuracy; instead, reference to the thermodynamic data contained in the steam tables must be made). Since the latent heat of the water vapor contained in the permeate is about 48 Btu/ft$^3$(STP), the process of the present invention achieves a net energy savings of about 43 Btu/ft$^3$(STP). This savings corresponds to approximately 89% of the latent heat of the water vapor. The present invention also recovers the sensible heat in the recycled drying air, although in this example this credit is small (about 0.095 Btu/ft$^3$(STP) of recirculated air).

In order to simplify the illustration, the different grades or availabilities of thermal and of mechanical or electrical energy have been ignored. In order to account approximately for the 40% efficiency of converting thermal to mechanical or electrical energy and to put the quantities of energy cited above on a consistent basis, the stated work of vapor compression should be multiplied by a factor of about 2.5 to derive its thermal equivalent. Another detail which has been neglected for the sake of simplicity is vapor superheat. Because the compressor or vacuum pump performs work on the vapor, the pressurized vapor may be superheated to a degree dependent on compressor efficiency and on the amount of heat transfer which occurs during the compression process. Any superheat is recovered upon condensation of the vapor.

In practice, the efficiency of energy recovery is affected by several other factors. Because the efficiencies of compressors and vacuum pumps are significantly lower than 100%, the ideal work of compression must be divided by the thermal efficiency $\eta T$ of compression in order to obtain the actual work requirement:

$$W_{actual} = W_{ideal}/\eta T$$

If $\eta T$ is taken as 70%, the actual compression work increases to 5.4/0.7 or 7.7 Btu/ft$^3$(STP) of recovered vapor, corresponding to 17% of the recoverable latent heat of the vapor.

A fundamental limitation on the extent of energy recovery made possible by the process of the present invention is related to the fractional recovery of water vapor from the dryer exhaust mixture. As this mixture is passed over the semipermeable membrane, it is progressively depleted of water vapor as a consequence of its selective permeation across the membrane. Consequently, the partial pressure $P_1$ of water vapor in contact with the membrane steadily decreases with residence time in the permeator, eventually falling to zero for the case of complete vapor recovery. For example, if one-half of the water vapor present in the dryer exhaust mixture of the previous example were to be recovered by permeation across a perfectly selective membrane, then the partial pressure $P_1$ of water vapor remaining in the non-permeated gas-vapor mixture would have fallen from 0.80 to 0.67 atm. In the process, the water vapor partial pressure difference across the membrane ($P_2-P_3$) will have decreased by about one-third, from 0.40 atm (i.e., 0.80–0.40) to 0.27 atm (i.e., 0.67–0.40). (The mixture is assumed to behave as an ideal gas for purposes of calculating the vapor partial pressure). As a result of this decrease in the driving force for permeation, the membrane area required to pass a given quantity of water vapor increases with the extent of vapor recovery accomplished. In addition, high vapor recovery affects the energy requirement for vapor compression by dictating a low permeate pressure $P_2$. For example, the partial pressure of residual water in the non-permeated mixture is only 0.29 atm for the case of 90% vapor recovery, thus requiring that the permeate pressure $P_2$ be reduced to a value at least this low. Since the work of vapor compression increases as $P_2$ decreases, there exists some optimum extent of vapor recovery in the permeator which can only be determined by considering the economics (i.e., both capital and operating costs) of both the permeation and compression processes.

Another limitation on energy recovery by this technique results from the fact that there exists an upper limit on the temperature at which the recovered latent heat of the vapor can be returned to the drying process. As the pressure $P_3$ of the compressed vapor is increased, the saturation temperature at which the vapor condenses is also increased, thus permitting the recovered energy to be returned to the process at a higher temperature. At the same time, however, the work required for vapor compression also increases with the pressure $P_3$, and at some point it becomes equal to the energy recoverable from the vapor. At this point, the efficiency of energy recovery drops to zero.

For the above example, based on a permeate pressure of 0.4 atm, the point at which the work of compression equals the latent heat recovered upon vapor condensation is encountered at a compressed vapor pressure $P_3$ of 4.9 ata, corresponding to a saturation or condensing temperature of 305° F. Some 18.2 Btu/ft$^3$(STP) of mechanical/electrical work are required to compress steam from 0.4 to 4.9 ata (i.e., a pressure ratio of 11) at 70% adiabatic compression efficiency. The thermal energy equivalent of this work is approximately 18.2/0.4 or 45.5 Btu/ft$^3$(STP), just equal to the latent heat of condensation of steam at 305° F. and 4.9 ata. Thus, the maximum temperature at which the recovered latent heat could be returned to the process is approximately 305° F., and allowance for the 10°–15° F. temperature difference required to achieve reasonable heat transfer rates further lowers the temperature of latent heat recovery to about 290° F.

In actuality, the compressed water vapor of this example would be significantly superheated as a result of the large amount of work performed on it upon compression. For adiabatic compression at 70% efficiency (driver losses neglected), the vapor of the above example would exit the vacuum pump/compressor at a temperature of about 972° F., corresponding to about 677° F. of vapor superheat. This superheat permits the breakeven condenser pressure and temperature to be further increased, and it raises the availability or effective temperature of the recovered energy. In the above example, the vapor superheat enthalpy (approximately 16.9 Btu/ft$^3$(STP)) amounts to nearly one-fourth of the total energy which could be obtained by condensing the superheated vapor at 4.9 ata (i.e., enthalpy of superheat plus latent heat of vaporization, or 16.9+45.5=62.4 Btu/ft$^3$(STP)). Thus, the effect of superheat is to raise the average temperature OVS/T/ at which the recovered energy can be utilized to approximately $$T = \frac{(16.9 \text{ Btu/ft}^3)\left(\frac{305° \text{ F.} + 972° \text{ F.}}{2}\right) + 45.5 \text{ Btu/ft}^3(305° \text{ F.})}{62.4 \text{ Btu/ft}^3}$$

$$= 395° \text{ F.}$$

Because the energy expended in vapor compression is large in this example, it is more meaningful to evaluate system performance in terms of a "coefficient of performance" (C.O.P.), the ratio of energy recovered to compressive work required, than it is to examine performance in terms of the fractional recovery of latent heat. In the present example, the C.O.P., defined as the ratio of energy recovered to compressive work required, is equal to 3.4 (i.e., 62.4 Btu/ft$^3$ ÷ 18.2 Btu/ft$^3$).

The separation membrane employed in the present invention must be highly permeable to the vapor which it is desired to recover and highly impermeable to gases such as air, the primary components of which are nitrogen and oxygen. The membrane should also be able to withstand continuous operation at elevated temperatures and at high humidities without deterioration.

The optimum membrane for water vapor recovery should be made from a hydrophilic polymer. Such polymers are not only highly permeable to water; they are also likely to be relatively impermeable to air, since both oxygen and nitrogen exhibit very low solubility in water and hence, by analogy, should exhibit low solubility in a hydrophilic membrane. The permeability coefficient is the product of the solubility and diffusivity of the permeant in the membrane. Because water, oxygen, and nitrogen all have similar molecular weights, their diffusivities in polymers are also usually comparable. Thus, because of the differences in solubilities and similarities in diffusivities, a hydrophilic polymeric membrane material can be expected to exhibit both high permeability to water and low permeability to air.

Suitable membranes useful in removing water vapor from air include hydrophilic polymeric reverse-osmosis desalination membranes. Reverse-osmosis membranes are known to exhibit a permeability to water vapor that is typically one hundred times greater than their permeability to oxygen and nitrogen, at least when these vapor and gas permeabilities are measured in separate experiments. Examples of such membranes are interfacially-polymerized composite reverse-osmosis membranes such as are made by interfacial reaction of polyethyleneimine with isophthaloyl chloride at one surface of a microporous polysulfone substrate, and a polyamide formed from piperazine and a mixed acyl halide reagent, both described by Cadotte et al. in "Interfacial Synthesis in the Preparation of Reverse Osmosis Membranes," *J. Macromol. Sci. Chem.* A15(1981)727. Other examples are the more conventional asymmetric reverse-osmosis membranes formed from a casting solution of cellulose acetate, acetone, magnesium perchlorate, and water, from which it is possible to prepare hydrophilic membranes known in the art as the Loeb-Sourirajan type described by Loeb et al. in *Adv. Chem. Ser.* 38(1962)117. Other exemplary membranes include the nitrogen-linked aromatic polyamide membranes described by Richter and Hoehn in U.S. Pat. No. 3,567,632.

Especially preferred water-vapor-permeable membranes are those used in gas separations. These are exemplified by the silicone rubbers including polydimethyl-siloxane described by Robb in *Ann. NY Academy of Sci.* 146(1967)119 and by Konikoff et al. in U.S. Pat. No. 3,303,105; organopolysiloxanepolycarbonate block copolymers as described by Ward et al. in *J. Memb. Sci.* 1(1976)99; cellulose and its esters including cellulose butyrate and cellulose acetate as described by Schell and Houston in *Chem. Engr. Progr.* 78:10(1982)33 and by Mazur and Chan in *Chem. Engr. Progr.* 78:10(1982)38; sulfonated 2,6-dimethyl polyphenylene oxide and sulfonated 2,6-diphenyl polyphenylene oxide described by Salemme in U.S. Pat. No. 3,735,559 and by Ward and Salemme in U.S. Pat. No. 3,780,496; natural and synthetic rubbers including cis-1,4-polyisoprenes described by Barrie et al. in *Polymer* 16(1975)811; and polyvinylalcohol described by Spencer and Ibrahim in *J. Poly. Sci.: Part A-2* 6(1968)2067.

Water vapor, oxygen, and nitrogen permeabilities for the above materials are presented in the references cited. Because the permeability of water vapor in particular can depend strongly on the conditions of its measurement (e.g., temperature and relative humidity), it is impractical to provide a comprehensive tabulation of vapor and gas permeabilities in this specification. However, exemplary permeation data for an acceptable waterselective polymeric membrane particularly useful in the practice of the present invention may be cited. Dimethyl silicone rubber is characterized by room temperature water vapor, oxygen, and nitrogen permeabilities of $3600.10^{-9}$, $60.10^{-9}$, and $28.10^{-9}$, respectively, where the membrane permeability $Pr_i$ to a particular permeant is measured in the following units:

$$\frac{cm^3 \text{ gas (STP)} - cm \text{ thickness}}{cm^2 \text{ membrane area-sec-cm Hg pressure difference}}$$

The membrane separation factor $\alpha_{ij}$ is given by the ratio of component permeabilities:

$$\alpha_{ij} = Pr_i/Pr_j$$

Thus, the $H_2O/O_2$ and $H_2O/N_2$ separation factors exhibited by silicone rubber at the stated conditions are 60 and 128, respectively.

It must be emphasized that these and other permeabilities cited in this specification have been measured for the most part in pure component permeation experiments. It is well known that the gas permeabilities of many polymers increase to a greater or lesser extent as the relative humidity of the permeant mixture increases, and for such polymers the $H_2O/O_2$ and $H_2O/N_2$ separation factors relevant to the permeation of these vapor-gas mixtures may be expected to be somewhat lower than those estimated from pure component permeability coefficients.

Sulfonated 2,6-dimethyl polyphenylene oxide as described by Salemme in U.S. Pat. No. 3,735,559 also has favorable permeation characteristics. Its water vapor permeability ranges from approximately 1000-30,000.$10^{-9}$ $cm^3(STP)$-$cm/cm^2$-sec-cmHg, dependent on relative humidity, whereas the $O_2$ and $N_2$ gas permeabilities of the $Na^{+-}$ counterion form of the resin are 0.7.$10^{-9}$ and 0.12.$10^{-9}$ $cm^3(STP)$-$cm/cm^2$-sec-cmHg, respectively. Thus, the $H_2O/O_2$ and $H_2/N_2$ separation factors estimated for this material on the basis of pure component permeabilities are on the order of $10^3$ to $10^4$. Sulfonated 2,6-diphenyl polyphenylene oxide as disclosed in the same reference is claimed to have superior heat resistance combined with desirable vapor permeation properties. Finally, gas-separation membranes prepared from blends of cellulose diacetate and cellulose triacetate are known to be highly water-vapor-permeable ($Pr_{H_2O} \approx 10$-$1000.10^{-9}$ $cm^3(STP)$-$cm/cm^2$-sec-cmHg). Again, vapor-gas separation factors can be expected to be very dependent on temperature and relative humidity, with estimated $H_2O/O_2$ and $H_2O/N_2$ separation factors in the range of about $10^2$ to $10^3$.

Other water-permeable membrane polymers useful in the practice of the present invention include ethyl cellulose, polyethyleneimine, ion-exchange polymers including the polystyrene sulfonates, polyvinyl butyral, polyvinyl acetate, polyethyl methacrylate, aliphatic polyamides including Nylon 6, polybutadiene, aromatic polyamides, polyimides, and polybenzimidazoles. The vapor and gas permeabilities of a number of these materials can be found, for example, in the following references: Rogers, "Permeability and Chemical Resistance," Chap. 9 in *Engineering Design for Plastics* (1964); Hwang et al., *Separation Science* 9(1974)461; Hauser and McCaren, *Ind. Eng. Chem.* 40(1948)112; and Barrie, "Water in Polymers," Chap. 8 in *Diffusion in Polymers* (1968).

Membranes that are highly selective for the permeation of vapors in preference to gases are desirable for several reasons. First, any gas that permeates across the membrane must be compressed with the co-permeating, recovered vapors, and the vacuum pump/compressor energy consumption increases in direct proportion to the volume of the vapor/gas mixture being compressed. Secondly, the presence of noncondensable gases interferes with the condensation of vapor by blanketing condenser heat exchange surfaces and slowing heat transfer. Thirdly, and more fundamentally, the presence of noncondensables limits the extent of vapor condensation at given condenser operating conditions.

These effects related to finite membrane selectivity are readily illustrated by extending the above example for an atmospheric-pressure dryer exhausting hot, moist air at 212° F., and 80% relative humidity (i.e., 0.8 atm water vapor partial pressure). As before, the permeate pressure $P_2$ is taken to be 0.4 atm, and the vacuum pump/compressor discharge pressure $P_3$ is set at 1.4 atm. In order to exaggerate the effects of low selectivity between vapor and gas, a calculation was performed for a hypothetical membrane exhibiting a modest $H_2O/N_2$ separation factor of 10. Furthermore, 90% recovery of water vapor in the membrane separator was assumed; high vapor recovery exacerbates the effects of low selectivity.

The permeate stream is estimated to contain 90.2% water vapor and 9.8% $N_2$ at these operating conditions. (All compositions are reported as mole percent.) The compression power varies directly with the amount of gas and vapor being handled and is somewhat dependent on its composition. Thus the effect of low selectivity (i.e.,$\alpha H_2O/N_2 = 10$) and the attendant permeation of nitrogen is to increase the power required for compression by approximately 11% to 8.5 Btu/ft(STP) (i.e., 7.7/0.90).

Although pure water vapor at 1.4 ata can be completely condensed at about 230° F., the presence of 9.8% $N_2$ in a mixture with steam reduces the dewpoint or temperature of initial vapor condensation. The dewpoint can be calculated as the saturation temperature corresponding to the partial pressure of steam in the mixture of 1.27 atm (i.e., 0.902.1.4). This maximum condensing temperature of 224° F. corresponds, however, to condensation of only a negligible fraction of the vapor in the mixture. If it is desired to condense 75% of the steam in the permeate mixture, then the partial pressure of uncondensed water vapor in the mixture exiting the condenser falls to 0.98 atm, and the temperature of condensation is lowered still further to 211° F. This temperature is too low for direct transfer of the recovered latent heat to the dryer at 212° F. Thus, relatively small concentrations of noncondensable gases in the permeate may significantly limit the extent and temperature of condensation of recovered vapor. Fortunately, the vapor/gas selectivity of preferred membranes will be well in excess of 10, and the limitations discussed here will be less serious.

In the above example, the unpermeated gas rejected by the membrane separator was estimated to contain 39% water vapor, notwithstanding removal of 90% of the vapor from the unpermeated gas in the membrane permeator. This calculation thus serves to illustrate the high vapor recoveries required in the permeator in order to dry the rejected gas sufficiently to permit its recycle to the dryer. In certain cases, it may be preferable to exhaust the rejected air and the heat contained therein rather than to recycle drying gas containing a significant amount of moisture.

It is evident that these design and operating principles for membrane heat and vapor recovery systems apply equally well to applications involving the concentration of liquid mixtures and solutions, since in solids drying and liquor concentration it is only the source of the vapor/gas mixture and not the method for energy recovery which differs.

The process can also be used for dehumidification of ambient air. Such dehumidification is usually accomplished in connection with air-conditioning systems by cooling the air to the desired dewpoint, and then reheating to the desired temperature. Using the present invention, the load on the heat pump can be significantly reduced by removing excess water by membrane drying.

The process of the present invention will also find application in the recovery of organic solvent vapors from mixtures with gases. Mixtures of solvent vapors and gases arise frequently in industrial coating and painting operations. Other applications arise in the removal of volatile solvents from polymers in fluidized-bed and other polymer drying processes; removal of the polymerization solvent methylene chloride from polycarbonate resin serves as an example. Still other applications exist in extraction operations, where extracted solutes are recovered from organic extractants by evaporation and concentration, and the unextracted material must often be freed of residual extraction solvent in a drying process. The production of decaffeinated coffee by extraction of caffein with methylene chloride serves as an example of this type of application.

Typical organic solvents which may be recovered by the method of the present invention include members of the following groups: the chlorinated hydrocarbons including carbon tetrachloride, chloroform, methylene chloride, trichloroethylene, trichloroethane, perchloroethylene, ethylene dichloride, and propylene dichloride; the hydrocarbons including naphtha and petroleum ether; ketones including acetone and cyclohexanone; ethers; the alcohols including methyl, ethyl, isopropyl, and butyl alcohols; carbon disulfide; and the aromatic hydrocarbons including benzene, toluene, and xylene. The latent heats of these organic compounds, while smaller in some cases than that of water vapor, provide one incentive for application of the present invention, while the prospect of recovering the organic materials themselves provides another incentive.

Membranes permeable to organic solvent vapors which are suitable for use in the method of the present invention may be prepared from the following polymers: the polyamides including Nylon 6 and Nylon 12; polyethylene; polypropylene; cellulose acetate; silicone rubber, poly(butadiene-acrylonitrile) rubber; polyethylene-styrene copolymers; polyvinylacetate; poly(ethylene terephthalate); poly(tetrafluoroethylene)-poly(4-vinyl pyridine or N-vinyl pyrrolidone) graft copolymers; and acrylonitrilevinylacetate copolymers. For example, poly(butadieneacrylonitrile) rubber is highly permeable to certain vapors including methyl ethyl ketone and benzene (Pr 60,000.10$^{-9}$ cm$^3$(STP)-cm/cm$^2$-sec-cmHg), ethyl acetate (Pr 33,000.10$^{-9}$), carbon tetrachloride (Pr 4650.10$^{-9}$), and methanol (Pr 2460.10$^{-9}$). The pure-component permeabilities of O$_2$ (Pr 0.16.10$^{-9}$) and N$_2$ (Pr 0.042.10$^{-9}$) in this material are very low, thus providing the selectivity required for the efficient recovery of these organic solvents and of the latent heat contained therein by the membrane process disclosed herein.

The terms and expressions which have been employed in the foregoing specification are used therein as terms of description and not of limitation, and there is no intention, in the use of such terms and expressions, of excluding equivalents of the features shown and described or portions thereof, it being recognized that the scope of the invention is defined and limited only by the claims which follow.

What is claimed is:

1. An energy-efficient process for the recovery of latent heat from a drying process comprising (1) contacting a material containing a volatile liquid with a gaseous drying medium and supplying heat to said drying medium or to said material and thereby producing an exhaust mixture of noncondensable gas and condensable vapor, (2) separating the condensable vapor in said exhaust mixture by passing it through a nonporous nonionic polymeric membrane which is substantially permeable to said condensable vapor and substantially impermeable to said noncondensable gas, (3) transferring said separated condensable vapor, together with the latent heat of condensation contained therein, to a compressor, (4) compressing in said compressor said separated condensable vapor, and (5) condensing said separated condensable vapor by heat exchange, thereby recovering the latent heat of condensation of said separated condensable vapor.

2. The process of claim 1 wherein the noncondensable gas from which said vapor has been separated, together with the sensible heat contained in said noncondensable gas, is recovered and reused.

3. The process of claim 1 wherein said condensable vapor is water vapor and its heat of condensation is reused.

4. The process of claim 3 wherein said nonporous nonionic polymeric membrane is prepared from a hydrophilic polymer.

5. The process of claim 3 wherein said nonporous nonionic polymeric membrane is selected from silicone rubbers, natural rubber, synthetic rubbers, cellulose, cellulose esters, polyvinyl alcohol, polyethyleneimine, arylene oxide polymers, arylene oxide ion-exchange polymers, polystyrene sulfonates, polyvinyl butyral, polyvinylacetate, polyethylmethacrylate, polybutadiene, aliphatic polyamides, aromatic polyamides, polyimides, and polybenzimidazoles.

6. The process of claim 1 wherein said condensable vapor is an organic solvent vapor selected from chlorinated hydrocarbons, aliphatic hydrocarbons, aromatic hydrocarbons, ketones, ethers, alcohols, and carbon disulfide.

7. The process of claim 6 wherein said nonporous nonionic polymeric membrane is selected from polyamides, polyethylene, polypropylene, cellulose acetate, silicone rubber, poly(butadiene-acrylonitrile) rubber, polyethylene-styrene copolymers, polyvinylacetate, poly(ethyleneterephthalate), poly(tetrafluoroethylene)-poly(4-vinyl pyridine or N-vinyl pyrrolidone) graft copolymers, and acrylonitrilevinylacetate copolymers.

8. In an industrial drying process for drying material, said process utilizing hot, dry gas as the drying medium and producing moist or solvent-containing exhaust gas, the improvement comprising:

(a) separating the exhaust gas into a warm, dry noncondensable gas component and a condensable vapor component by passing the condensable vapor in said exhaust mixture through a nonporous nonionic polymeric membrane that is substantially permeable to said condensable vapor and substantially impermeable to said noncondensable gas;

(b) transferring said separated condensable vapor, together with the heat of condensation contained therein, to a compressor;

(c) compressing in said compressor the condensable vapor in said condensable vapor component;

(d) condensing the condensable vapor in said condensable vapor component by heat exchange, thereby recovering the heat of condensation of said condensable vapor; and (e) transferring by heat transfer means said heat of condensation to said hot, dry gas-drying medium or to the material being dried.

9. The process of claim 8 wherein said condensable vapor component is compressed with a mechanical compressor or vacuum pump.

10. The process of claim 8 wherein said warm, dry noncondensable gas component is recirculated for reuse as the drying medium.

11. The process of claim 10 wherein said heat transfer means is a vapor-to-gas heat exchanger which effects a transfer of the heat of condensation of said vapor to said hot, dry gas drying medium.

12. The process of claim 8 wherein said condensable vapor component of said exhaust gas is water vapor.

13. The process of claim 12 wherein said nonporous nonionic polymeric membrane is prepared from a hydrophilic polymer.

14. The process of claim 13 wherein said nonporous nonionic polymeric membrane is selected from silicone rubbers, natural rubber, synthetic rubbers, cellulose, cellulose esters, polyvinyl alcohol, polyethyleneimine, arylene oxide polymers, arylene oxide ion-exchange polymers, polystyrene sulfonates, polyvinyl butyral, polyvinylacetate, polyethylmethacrylate, polybutadiene, aliphatic polyamides, aromatic polyamides, polyimides, and polybenzimidazoles.

15. The process of claim 8 wherein the hot, dry gas is air or nitrogen.

16. The process of claim 8 wherein said condensable vapor component of said exhaust gas is an organic solvent vapor selected from chlorinated hydrocarbons, aliphatic hydrocarbons, aromatic hydrocarbons, ketones, ethers, alcohols, and carbon disulfide.

17. The process of claim 16 wherein said nonporous nonionic polymeric membrane is selected from polyamides, polyethylene, polypropylene, cellulose acetate, silicone rubber, poly(butadiene-acrylonitrile) rubber, polyethylene-styrene copolymers, polyvinylacetate, poly(ethylene terephthalate), poly(tetrafluoroethylene)-poly(4-vinyl pyridine or N-vinyl pyrrolidone) graft copolymers, and acrylonitrilevinylacetate copolymers.

18. The process of claim 8 wherein the relative humidity of the moist or solvent-containing exhaust gas is from about 30% to about 100%.

19. The process of claim 8 wherein the temperature of the moist or solvent-containing exhaust gas is from about 40° C. to about 125° C.

20. The process of claim 8 wherein the partial pressure of water or solvent vapor in the moist or solvent-containing exhaust gas is at least 0.1 atm.

21. The process of claim 8 wherein the heat transfer means is an indirect heat exchanger and the heat of condensation is transferred to the material being dried.

22. In a process for the concentration of a liquid mixture or solution by evaporation, said process comprising heating the liquid mixture or solution, contacting the liquid mixture or solution with a substantially dry, gaseous stream, and thereby producing a moist, gaseous exhaust mixture, the improvement comprising:
(a) separating the moist, gaseous exhaust mixture into a warm, dry noncondensable gas component and a condensable vapor component by passing said exhaust mixture through a nonporous nonionic polymeric membrane that is substantially permeable to said condensable vapor component and substantially impermeable to said noncondensable gas component;
(b) transferring said separated condensable vapor, together with the heat of condensation contained herein, to a compressor;
(c) compressing in said compressor the condensable vapor in said condensable vapor component;
(d) condensing the condensable vapor in said vapor component by heat exchange, thereby recovering the heat of condensation of said condensable vapor; and
(e) transferring by heat transfer means said heat of condensation to the gaseous drying medium or to the material being concentrated.

23. The process of claim 22 wherein said condensable vapor component is compressed with a mechanical compressor or vacuum pump, said compressor or pump being driven by a motor or a steam-driven turbine.

24. The process of claim 22 said warm, dry noncondensable gas component is recirculated for reuse as the substantially dry gaseous stream.

25. The process of claim 24 wherein said heat transfer means is a vapor-to-gas heat exchanger which transfers said heat of condensation to said gaseous drying medium.

26. The process of claim 22 wherein said condensable vapor is water vapor.

27. The process of claim 26 wherein said nonporous nonionic polymeric membrane is prepared from a hydrophilic polymer.

28. The process of claim 27 wherein said nonporous polymeric membrane is selected from silicone rubbers, natural rubber, synthetic rubbers, cellulose, cellulose esters, polyvinyl alcohol, polyethyleneimine, arylene oxide polymers, arlene oxide ion-exchange polymers, polystyrene sulfonates, polyvinyl butyral, polyvinylacetate, polyethylmethacrylate, polybutadiene, aliphatic polyamides, aromatic polyamides, polyimides, and polybenzimidazoles.

29. The process of claim 22 wherein the substantially dry gaseous stream is air or nitrogen.

30. The process of claim 22 wherein said condensable vapor component is an organic solvent vapor selected from chlorinated hydrocarbons, aliphatic hydrocarbons, aromatic hydrocarbons, ketones, ethers, alcohols, and carbon disulfide.

31. The process of claim 30 wherein said nonporous nonionic polymeric membrane is selected from polyamides, polyethylene, polypropylene, cellulose acetate, silicone rubber, poly(butadiene-acrylonitrile) rubber, polyethylene-styrene copolymers, polyvinylacetate, poly(ethylene terephthalate), poly(tetrafluoroethylene-poly(4-vinyl pyridine or N-vinyl pyrrolidone) graft copolymers, and acrylonitrilevinylacetate copolymers.

32. The process of claims 6, 16 or 30 wherein said condensable vapor is recovered after condensation.

33. The process of claim 22 wherein the relative humidity of the moist, gaseous exhaust mixture is from about 30% to about 100%.

34. The process of claim 22 wherein the temperature of the moist, gaseous exhaust mixture is from about 40° C. to about 125° C.

35. The process of claim 22 wherein the partial pressure of water or solvent vapor in the moist, gaseous exhaust mixture is at least 0.1 atm.

36. The process of claim 22 wherein said condensable vapor component is compressed and condensed on one surface of an indirect heat exchanger, another surface of said indirect heat exchanger being in contact with said liquid mixture or solution whereby the heat of condensation of said condensable vapor component is transferred to said liquid mixture or solution.

37. The process of claim 22 wherein said heat transfer means is an indirect heat exchanger and said noncondensable vapor component is compressed and used to preheat said liquid mixture or solution by passing said compressed vapor to and condensing said compressed vapor in said indirect heat exchanger, one surface of which is in contact with said liquid mixture or solution.

* * * * *

UNITED STATES PATENT AND TRADEMARK OFFICE
CERTIFICATE OF CORRECTION

PATENT NO. : 4,466,202

DATED : August 21, 1984

INVENTOR(S) : Ulrich Merten

It is certified that error appears in the above-identified patent and that said Letters Patent is hereby corrected as shown below:

Col. 9, line 26 change "OVS/T/" to $--\overline{T}--$.

Ccl. 11, line 37 change "103" to $--10^3--$.

Signed and Sealed this

First Day of October 1985

[SEAL]

Attest:

DONALD J. QUIGG

Attesting Officer

Commissioner of Patents and Trademarks—Designate